United States Patent
Okabe et al.

(10) Patent No.: US 7,953,322 B2
(45) Date of Patent: May 31, 2011

(54) OPTICAL SWITCH AND OPTICAL SWITCH CONTROL METHOD

(75) Inventors: Ryou Okabe, Kawasaki (JP); Shigeki Watanabe, Kawasaki (JP); Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 11/987,576

(22) Filed: Nov. 30, 2007

(65) Prior Publication Data
US 2008/0131137 A1    Jun. 5, 2008

(30) Foreign Application Priority Data
Nov. 30, 2006    (JP) ................. 2006-323449

(51) Int. Cl.
*H04J 14/00* (2006.01)
(52) U.S. Cl. ........................................... 398/45
(58) Field of Classification Search ........... 398/25
See application file for complete search history.

(56) References Cited

U.S. PATENT DOCUMENTS

| | | | |
|---|---|---|---|
| 6,859,268 B2 * | 2/2005 | Chou et al. | 356/73.1 |
| 7,372,568 B1 * | 5/2008 | Yao | 356/369 |
| 2003/0048973 A1 * | 3/2003 | Asami | 385/11 |
| 2006/0051100 A1 | 3/2006 | Watanabe | |
| 2006/0159463 A1 * | 7/2006 | Futami et al. | 398/152 |

FOREIGN PATENT DOCUMENTS

JP    2006-184851    7/2006
WO    WO 2005/093497 A1 * 10/2005

* cited by examiner

*Primary Examiner* — Shi K Li
(74) *Attorney, Agent, or Firm* — Staas & Halsey LLP

(57) ABSTRACT

According to an aspect of embodiment, an optical switch comprises a signal light input unit, a control light input unit, a first polarization controller, a second polarization controller, a coupler, a nonlinear medium, a monitor and a controller. The first polarization controller controls a polarization of a signal light. The second polarization controller controls a polarization of a control light. The nonlinear medium generates an intensity correlation signal. The monitor monitors a polarization state of light outputted from the nonlinear medium. The controller controls the first polarization controller and the second polarization controller on the basis of the polarization of the signal light and the polarization of the control light.

10 Claims, 6 Drawing Sheets

000
OPTICAL SWITCH AND OPTICAL SWITCH CONTROL METHOD

BACKGROUND OF THE INVENTION

1. Field of the Invention

The present art relates to an optical switch in which a nonlinear optical effect produced in a nonlinear medium is used, an optical waveform measuring device, and a method for controlling an optical switch.

2. Description of the Related Art

Recently, as the capacity of optical fiber communications has increased, the bit rate of transmission systems has reached 40 Gb/s. In studies on the next generation systems, research and development of transmission of optical signals at 160 Gb/s or more per wavelength are conducted. In research and development of such transmission systems, optical waveform measuring devices (sampling oscilloscopes) that measure the waveform of signal light are mandatory to monitor and evaluate the quality of signal light.

A switch that appropriately samples signal light is used to measure the waveform of signal light with an optical waveform measuring device. In a known optical waveform measuring device, photoelectric conversion of light signals is first performed with a photoelectric converter, and converted electrical signals are electrically sampled with an electronic circuit to measure the waveform of light.

In such a known optical waveform measuring device, the performance is restricted by the speed (band) of processing electrical signals because signals are processed entirely by an electric circuit after the photoelectric converter. For example, in a case the electric circuit has a speed of processing electrical signals of 40 GHz, when signal light of 40 Gb/s or more is switched, signal light in a band exceeding 40 GHz cannot be correctly switched.

On the other hand, there is disclosed an optical signal processing technique for processing signals by controlling an optical signal with another optical signal, using a nonlinear optical effect produced in a nonlinear medium. For example, the nonlinear medium may use Japanese laid-open Patent No. 2006-184851. The response speed of a nonlinear optical effect is said to be about a femtosecond, and the speed of processing signals in an optical switch to which this effect is applied greatly exceeds the aforementioned speed of processing electrical signals. An optical waveform measuring device that can measure signal light of Tb/s can be implemented by applying this optical switch to an optical waveform measuring device.

FIG. 8 is a block diagram showing the structure of a known optical switch. A known optical switch 800 includes a polarization controller 801a, a polarization controller 801b, an optical coupler 802, a highly nonlinear fiber 803, a polarizer 804, and an optical band-pass filter 805, as shown in FIG. 8. The polarization controller 801a adjusts the polarization direction of input signal light to a polarization direction inclined 90° with respect to a pass axis of the polarizer 804.

The polarization controller 801b adjusts the polarization direction of an input sampling pulse to a polarization direction inclined about 45° with respect to the pass axis of the polarizer 804. The optical coupler 802 couples the signal light and the sampling pulse, the polarization directions of which are respectively adjusted by the polarization controller 801a and the polarization controller 801b. The highly nonlinear fiber 803 passes the signal light and the sampling pulse coupled by the optical coupler 802 and generates an intensity correlation signal of the signal light and the sampling pulse.

The polarization direction of the signal light is rotated by a nonlinear optical effect in the highly nonlinear fiber, and the signal light is output, with the polarization direction of the signal light being close to the polarization direction of the sampling pulse. The polarizer 804 has a pass axis oriented in a predetermined direction of signal light and a sampling pulse and passes only polarized components the polarization direction of which is parallel to the pass axis. The optical band-pass filter 805 passes and outputs only a polarized component of signal light out of polarized components of signal light and sampling pulse, the polarized components having passed through the polarizer 804.

In such a structure, switching of signal light is performed by controlling the timing of input of a sampling pulse into the highly nonlinear fiber 803. In a case where the optical switch 800 is applied to an optical waveform measuring device, photoelectric conversion of signal light output from the optical switch 800 is performed with a photo detector, and the waveforms of converted electrical signals are displayed to measure the waveform of signal light.

SUMMARY

According to an aspect of embodiment, an optical switch comprises:

a signal light input unit inputting a signal light;

a control light input unit inputting a control light;

a first polarization controller for controlling a polarization of the signal light outputted from the signal light input unit;

a second polarization controller for controlling a polarization of the control light outputted from control light input unit;

a coupler for multiplexing the signal light outputted from the first polarization controller and the control light outputted from the second polarization controller;

a nonlinear medium for generating an intensity correlation signal between the signal light and the control light, the nonlinear medium for transmitting the signal light and the control light outputted from the coupler;

a monitor for monitoring polarization states of a signal light outputted from the nonlinear medium and the control light outputted from the nonlinear medium; and a controller for controlling the first polarization controller and the second polarization controller on the basis of the polarization state monitored by the monitor so as to incline the polarization of the signal light and the polarization of the control light with respect to a predetermined polarization direction.

DESCRIPTION OF THE PREFERRED EMBODIMENT

However, in the aforementioned known art, the condition for stably and correctly switching signal light is that signal light and sampling pulses the polarization states of which are stable are input. Thus, a problem exists in that signal light the polarization state of which is unstable because, for example, the signal light propagates through a long-distance optical fiber cannot be correctly switched. Moreover, another problem exists in that the waveform of signal light cannot be correctly measured because signal light cannot be correctly switched.

In view of this situation, an arrangement can be considered. In the arrangement, the polarization state of signal light the polarization direction of which is adjusted by the polarization controller 801a is monitored, and feedback control is performed in adjustment of the polarization direction of signal light on the basis of the result of monitoring. However, an unstable polarization state of signal light may occur in the optical switch 800 due to changes in the external environment, for example, a change in the temperature or vibrations, so that a correct polarization state of signal light at the time signal light passes through the polarizer 804 may not be monitored. In this case, a problem exists in that the polarization direction of signal light cannot be appropriately adjusted, so that signal light cannot be correctly switched This embodiment solves the aforementioned problems, and it is an object of the embodiment to provide an optical switch that can stably switch signal light and an optical waveform measuring device that can stably and correctly measure the waveform of signal light, regardless of the polarization states of input signal light and sampling pulses, and a control method.

An optical switch, an optical waveform measuring device, and a control method according to a preferred embodiment of the embodiment will now be described in detail with reference to the attached drawings.

Figure 1:
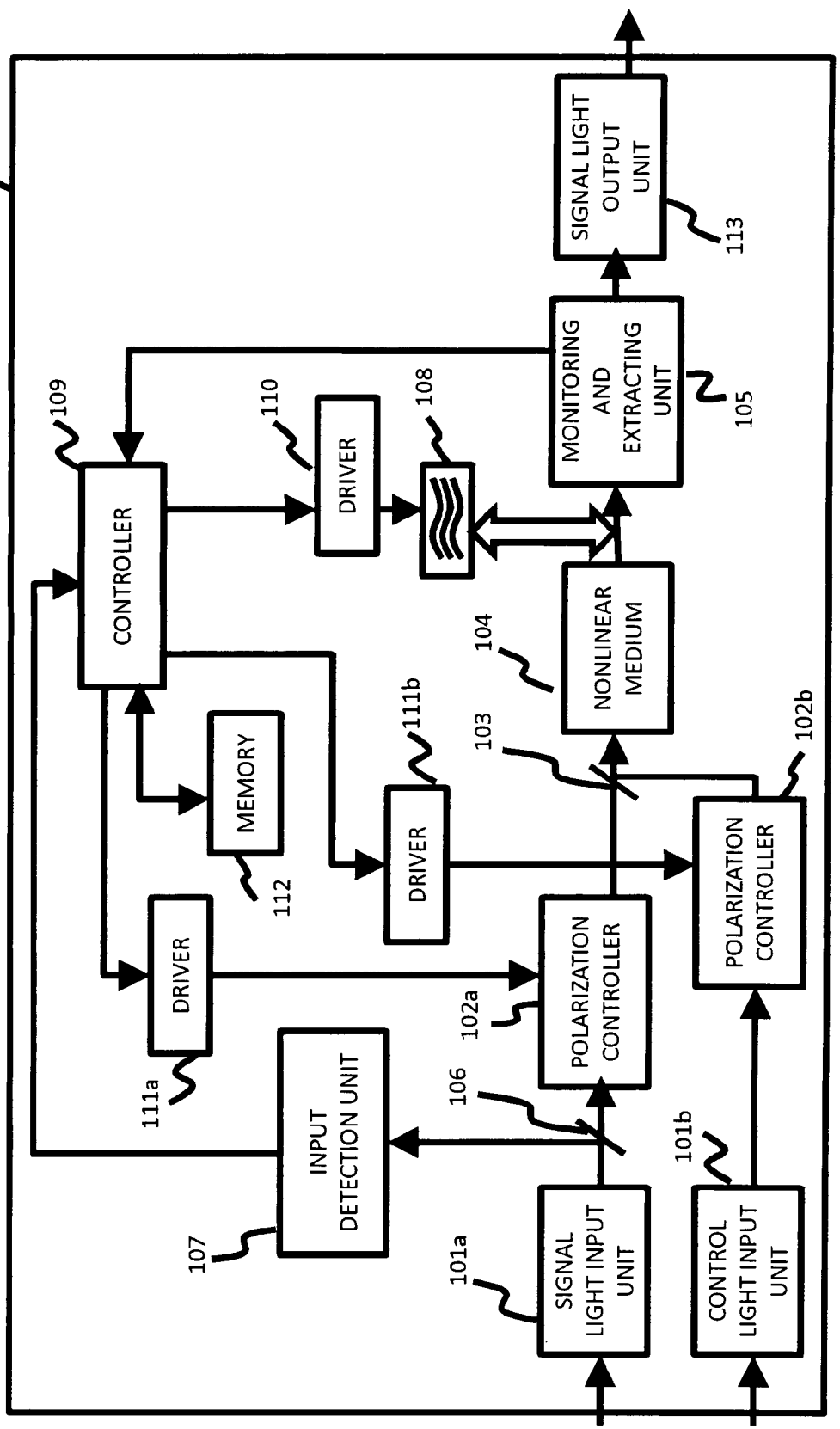
FIG. 1 is a block diagram showing the structure of an optical switch according to an embodiment.

FIG. 1 is a block diagram showing the structure of an optical switch according to the embodiment. An optical switch 100 according to the embodiment includes a signal light input unit 101a, a control light input unit 101b, a polarization controller 102a, a polarization controller 102b, a coupling unit 103, a nonlinear medium 104, a monitoring-and-extracting unit 105, a optical power splitter 106, an input detection unit 107, a blocking unit 108, a control unit 109, a drive unit 110, a drive unit 111a, a drive unit 111b, a memory 112, and a signal light output unit 113, as shown in FIG. 1.

Signal light is input to the signal light input unit 101a, and the signal light input unit 101a outputs the signal light to the polarization controller 102a. The signal light is signal light subjected to switching, the output of the signal light being turned on/off by the optical switch 100. When the optical switch 100 is applied to an optical waveform measuring device, the signal light is signal light subjected to measurement, the waveform of the signal light being measured by the optical waveform measuring device.

Control light is input to the control light input unit 101b at predetermined intervals, and the control light input unit 101b outputs the control light to the polarization controller 102b. The control light is pulsed light that is input when the output of signal light from the optical switch 100 is turned on. When the optical switch 100 is applied to an optical waveform measuring device, the control light is a sampling pulse that is input when signal light is sampled. Moreover, the wavelength of control light is different from the wavelength of signal light. The wavelength of control light is, for example, an average zero-dispersion wavelength of the nonlinear medium 104.

The polarization controller 102a adjusts the polarization direction of signal light output from the signal light input unit 101a to a predetermined polarization direction and outputs signal light to the coupling unit 103. The polarization controller 102b adjusts the polarization direction of control light output from the control light input unit 101b to a predetermined polarization direction and outputs control light to the coupling unit 103. The polarization controller 102a and the polarization controller 102b are driven respectively by the drive unit 111a and the drive unit 111b to adjust the polarization direction of signal light. The polarization controller 102a and the polarization controller 102b each include a wave plate, an optical fiber stress applying polarization control unit, or the like.

The coupling unit 103 couples signal light output from the polarization controller 102a and control light output from the polarization controller 102b and outputs the signal light and the control light to the nonlinear medium 104. In this case, the coupling unit 103 includes an optical coupler. Since signal light is different from control light in wavelength, even when signal light and control light are coupled, signal light and control light can be coupled without interference between them.

The nonlinear medium 104 passes signal light and control light output from the coupling unit 103 and generates an intensity correlation signal of the signal light and the control light. An intensity correlation signal is a correlation signal of a part in which signal light and control light coincide with each other and is output, with the intensity of the intensity correlation signal being proportional to the intensity of signal light. Moreover, when an intensity correlation signal is generated, signal light is output, with the polarization direction of the signal light being close to the polarization direction of control light. The nonlinear medium 104 includes, for example, a highly nonlinear fiber.

The monitoring-and-extracting unit 105 monitors the polarization states of signal light and control light having passed through the nonlinear medium 104. In this case, the monitoring-and-extracting unit 105 obtains pieces of intensity information of various polarized components of signal light and control light and outputs the obtained individual pieces of intensity information to the control unit 109. The intensity information of various polarized components of signal light and control light is information necessary to calculate Stokes parameters described below.

Moreover, the monitoring-and-extracting unit 105 extracts a polarized component of signal light having passed through the nonlinear medium 104, the polarization angle of the polarized component being parallel to a predetermined polarization direction (hereinafter referred to as a polarization direction x) and outputs the polarized component to the signal light output unit 113. Specifically, the monitoring-and-extracting unit 105 extracts a polarized component the polarization angle of which is parallel to the polarization direction x by including a polarizer that passes only polarized components in the polarization direction x. The polarization direction x is determined by the angle of a pass axis through which the polarizer passes light.

The optical power splitter 106 separates a part of signal light output from the signal light input unit 101a to the polarization controller 102a and outputs the part of the signal light to the input detection unit 107. In this case, the optical power splitter 106 includes an optical coupler. The input detection unit 107 detects the input of signal light into the signal light input unit 101a on the basis of signal light output from the optical power splitter 106 and outputs the result of detection to the control unit 109.

The blocking unit 108 passes only signal light out of signal light and control light that have passed through the nonlinear medium 104 and are to be output to the monitoring-and-extracting unit 105. Specifically, the blocking unit 108 includes, for example, a band-pass filter that passes only light having the same wavelength as signal light or a band-rejection filter that blocks only light having the same wavelength as control light.

Moreover, the blocking unit 108 blocks or passes control light under the control of the control unit 109. Specifically, the blocking unit 108 blocks or passes control light by changing the position to a position such that signal light and control light that have passed through the nonlinear medium 104 and are to be output to the monitoring-and-extracting unit 105 enter or another position such that such signal light and control light do not enter, under the control of the control unit 109.

The control unit 109 controls the polarization controller 102a and the polarization controller 102b on the basis of the monitoring state monitored by the monitoring-and-extracting unit 105. The monitoring state monitored by the monitoring-and-extracting unit 105 is the intensity information of various polarized components of signal light and control light output from the monitoring-and-extracting unit 105.

Specifically, the control unit 109 calculates Stokes parameters on the basis of the intensity information of various polarized components of signal light and control light. The control unit 109 controls the polarization controller 102a via the drive unit 111a on the basis of the calculated Stokes parameters of signal light so that the polarization direction of signal light is inclined 90° (including about 85° to 95°, hereinafter the same applies) with respect to the polarization direction x. Moreover, the control unit 109 controls the polarization controller 102b via the drive unit 111b on the basis of the calculated Stokes parameters of control light so that the polarization direction of control light is inclined 45° (including about 40° to 50°, hereinafter the same applies) with respect to the polarization direction x.

Moreover, when it is determined on the basis of the result of detection output from the input detection unit 107 that no signal light is being input to the signal light input unit 101a, the control unit 109 controls the blocking unit 108 so as to pass control light and controls the polarization controller 102b so that the polarization direction of control light is inclined 45° with respect to the polarization direction x.

Moreover, when it is determined on the basis of the result of detection output from the input detection unit 107 that signal light is being input to the signal light input unit 101a, the control unit 109 controls the blocking unit 108 so as to block control light and controls the polarization controller 102a so that the polarization direction of signal light is inclined 90° with respect to the polarization direction x.

The drive unit 110 changes the position of the blocking unit 108 to a position such that signal light and control light that have passed through the nonlinear medium 104 and are to be output to the monitoring-and-extracting unit 105 enter or another position such that such signal light and control light do not enter, under the control of the control unit 109. Specifically, the drive unit 110 puts the blocking unit 108 on a light path of signal light and control light or removes the blocking unit 108 from the light path, under the control of the control unit 109.

The drive unit 111a and the drive unit 111b drive the polarization controller 102a and the polarization controller 102b, respectively, under the control of the control unit 109 so as to adjust the polarization directions of signal light and control light to predetermined polarization directions. For example, when the polarization controller 102a and the polarization controller 102b each include a wave plate, the polarization directions of signal light and control light are adjusted by changing the crystal orientation of the wave plate. Alternatively, when the polarization controller 102a and the polarization controller 102b each include an optical fiber stress applying polarization control unit, the polarization directions of signal light and control light are adjusted by changing stress on the polarization control unit.

The memory 112 stores the drive conditions (control conditions) of the drive unit 111a or the drive unit 111b at the time the polarization controller 102a or the polarization controller 102b is controlled by the control unit 109. The control unit 109 sequentially stores the drive conditions in the memory 112 when controlling the polarization controller 102a or the polarization controller 102b.

Moreover, the control unit 109 drives the polarization controller 102a or the polarization controller 102b again on the basis of the last saved drive conditions to control the polarization controller 102a or the polarization controller 102b. The signal light output unit 113 outputs a polarized component of signal light extracted by and output from the monitoring-and-extracting unit 105 as switched signal light.

In this case, it is assumed that the optical switch 100 includes the control light input unit 101b, and control light is input from the outside. Alternatively, the optical switch 100 may include a generation unit that generates control light. Moreover, since the wavelength of signal light to be input to the optical switch 100 varies, it is preferable that the blocking unit 108 include a band-rejection filter that blocks only light having the same wavelength as control light. In this arrangement, switching can be performed in response to signal light beams having various wavelengths.

Moreover, other than a wave plate and an optical fiber stress applying polarization control unit described above, various types of polarization control unit, for example, an LiNbO3 (LN) modulator type, a liquid crystal type, and a Faraday rotator type, can be used as the polarization controller 102a and the polarization controller 102b.

Figure 2:
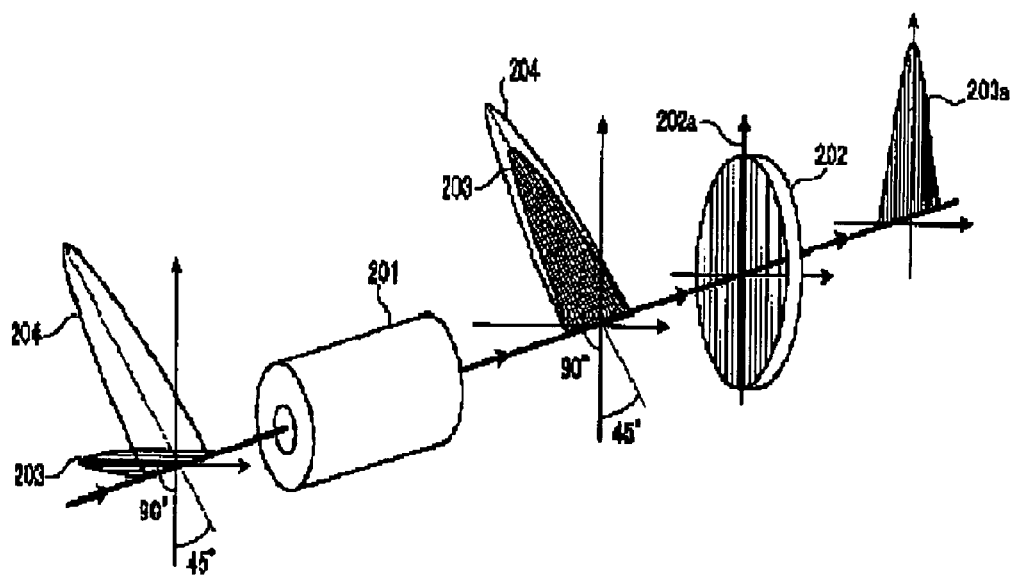
FIG. 2 shows the basic principle of the switching operation of the optical switch according to the embodiment.

FIG. 2 shows the basic principle of the switching operation of the optical switch according to the embodiment. In FIG. 2, a highly nonlinear fiber 201 corresponds to the aforementioned nonlinear medium 104. A polarizer 202 is a polarizer included in the aforementioned monitoring-and-extracting unit 105. In this case, the direction of a pass axis 202a of the polarizer is the aforementioned polarization direction x.

When signal light 203 the polarization direction of which is inclined 90° with respect to the pass axis 202a of the polarizer 202 and control light 204 the polarization direction of which is inclined 45° with respect to the pass axis 202a of the polarizer 202 are input to the highly nonlinear fiber 201, an intensity correlation signal is generated in the highly nonlinear fiber 201, and the polarization direction of the signal light 203 is rotated by the action of four-wave mixing in response to the intensity of the control light 204 in a direction such that the polarization direction of the signal light 203 is close to the polarization direction of the control light 204, as shown in FIG. 2.

As a result, a polarized component 203a the polarization direction of which is parallel to the pass axis 202a of the polarizer 202 is generated in the signal light 203, and the polarized component 203a passes through the polarizer 202. In this case, the higher the intensity of the control light 204 input together with the signal light 203, the larger the rotation of the polarization direction of the signal light 203, so that a large number of the polarized components 203a, the polarization direction of which is parallel to the pass axis 202a of the polarizer 202, are generated.

On the other hand, when only the signal light 203, the polarization direction of which is inclined 90° with respect to the pass axis 202a of the polarizer 202, is input to the highly nonlinear fiber 201, the polarization direction of the signal light 203 is not rotated, so that the signal light 203 does not pass through the polarizer 202. That is to say, only when the intense control light 204 is input to the highly nonlinear fiber 201, the signal light 203 passes through the polarizer 202.

Switching of the signal light 203 can be performed by controlling the timing of input of the control light 204 into the highly nonlinear fiber 201, using this effect. In this case, not only the signal light 203 but also the control light 204 passes through the polarizer 202. Thus, when switching is performed, the control light 204 is blocked by the blocking unit 108.

Figure 3:
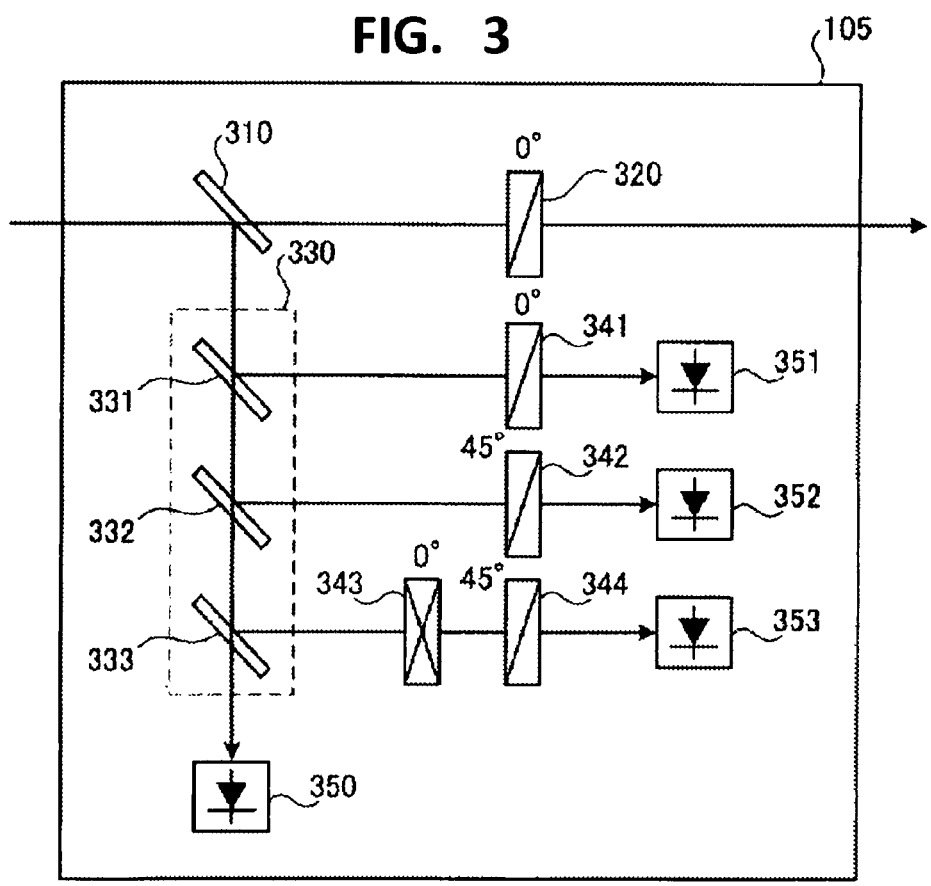
FIG. 3 is a first block diagram showing the structure of a monitoring-and-extracting unit of the optical switch according to the embodiment.

FIG. 3 is a first block diagram showing the structure of the monitoring-and-extracting unit of the optical switch according to the embodiment. The monitoring-and-extracting unit 105 includes a dividing unit 310, a polarizer 320, a dividing unit 330, a polarizer 341, a polarizer 342, a quarter wave plate 343, a polarizer 344, and four photo detectors (PDs) 350 to 353, as shown in FIG. 3.

The dividing unit 310 splits signal light and control light having passed through the nonlinear medium 104 to output one split light component to the polarizer 320 and the other split light component to the dividing unit 330. The polarizer 320 corresponds to the aforementioned polarizer 202 (see FIG. 2). The polarizer 320 passes only a polarized component of the light component output from the dividing unit 310, the polarization direction of the polarized component being parallel to the polarization direction x, and outputs the polarized component to the signal light output unit 113.

The dividing unit 330 splits the light component output from the dividing unit 310 into four split light components. Specifically, the dividing unit 330 includes optical couplers 331 to 333. The optical coupler 331 outputs, to the polarizer 341, one fourth of the light component output from the dividing unit 310, and outputs, to the optical coupler 332, the other three fourths of the light component output from the dividing unit 310.

The optical coupler 332 outputs, to the polarizer 342, one third of the light component output from the optical coupler 331, and outputs, to the optical coupler 333, the other two thirds of the light component output from the optical coupler 331. The optical coupler 333 outputs, to the quarter wave plate 343, one half of the light component output from the optical coupler 332, and outputs, to the PD 350, the other half of the light component output from the optical coupler 332.

The polarizer 341 is a polarizer that passes only a polarized component of the split light component output from the optical coupler 331, the polarization direction of the polarized component being parallel to the polarization direction x. The polarizer 341 may be a polarizer that passes only a polarized component of the split light component output from the optical coupler 331, the polarization direction of the polarized component being inclined 90° with respect to the polarization direction x. The PD 351 is a photo detector that receives the split light component having passed through the polarizer 341 and converts the split light component to electrical signals.

The polarizer 342 is a polarizer that passes only a polarized component of the split light component output from the optical coupler 332, the polarization direction of the polarized component being inclined 45° with respect to the polarization direction x. The PD 352 is a photo detector that receives the split light component having passed through the polarizer 342 and converts the split light component to electrical signals.

The quarter wave plate 343 passes only a circularly polarized component of the split light component output from the optical coupler 333. The polarizer 344 is a polarizer that passes only a polarized component of the split light component output from the optical coupler 333, the polarization direction of the polarized component being inclined 45° with respect to the polarization direction x. The PD 353 is a photo detector that receives the split light component having passed through the polarizer 344 and converts the split light component to electrical signals. The PD 350 is a photo detector that directly receives the split light component output from the optical coupler 333 and converts the split light component to electrical signals.

Although not shown, the electrical signals converted by the PDs are output to the control unit 109 as the aforementioned intensity information of various polarized components of signal light and control light. The control unit 109 calculates Stokes parameters ($S_0$, $S_1$, $S_2$, $S_3$) using Equations (1) to (4) described below. In this case, $PD_0$ to $PD_3$ represent the intensities of electrical signals that are received and converted by the PDs 350 to 353.

$$S_0 = PD_0 \quad (1)$$

$$S_1 = 2PD_1 - PD_0 \quad (2)$$

$$S_2 = 2PD_2 - PD_0 \quad (3)$$

$$S_3 = 2PD_3 - PD_0 \quad (4)$$

Figure 4:
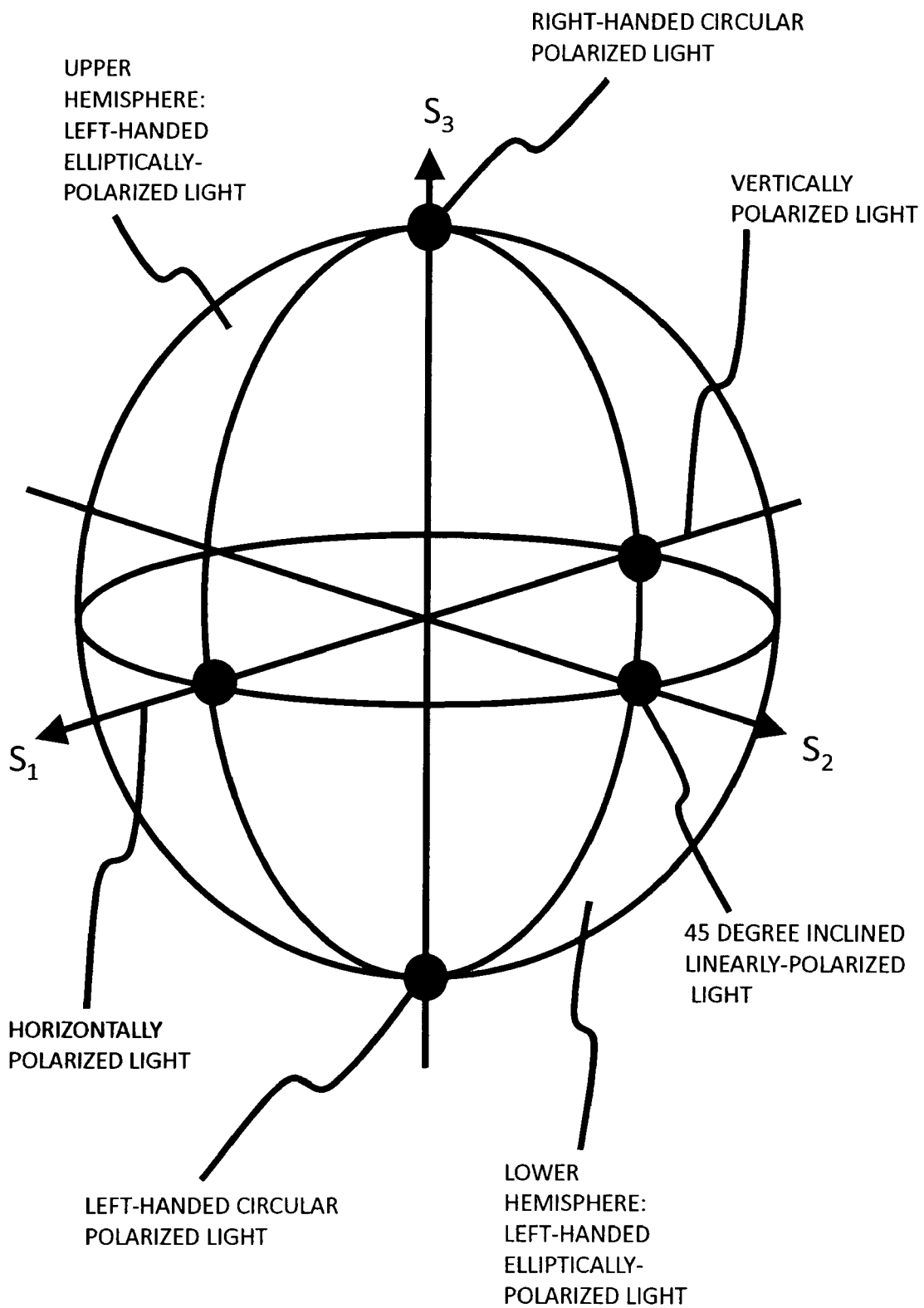
FIG. 4 shows a Poincare sphere that represents Stokes parameters.

FIG. 4 shows a Poincare sphere that represents Stokes parameters. Each of the Stokes parameters ($S_0$, $S_1$, $S_2$, $S_3$) calculated by the control unit 109 is represented by a point on the Poincare sphere, as shown in FIG. 4. In the Poincare sphere, $S_0$ corresponds to the radius of the sphere and represents the intensity. $S_1$ represents horizontally polarized light and vertically polarized light. $S_2$ represents diagonally polarized components. $S_3$ represents circularly polarized light. The relationships between the individual values $S_0$ to $S_3$ of the Stokes parameters are shown by the following Equation (5).

$$S_0^2 = S_1^2 + S_2^2 + S_3^2 \quad (5)$$

When ($S_0$, $S_1$, $S_2$, $S_3$)=(1, 1, 0, 0), monitored light is linearly polarized light that is parallel to the polarization direction x and passes through the polarizer 320. When ($S_0$, $S_1$, $S_2$, $S_3$)=(1, −1, 0, 0), monitored light is linearly polarized light that is inclined 90° with respect to the polarization direction x and does not pass through the polarizer 320.

When ($S_0$, $S_1$, $S_2$, $S_3$)=(1, 0, 1, 0) or (1, 0, −1, 0), monitored light is linearly polarized light that is inclined 45° with respect to the polarization direction x. In this case, this light includes a polarized component that passes through the polarizer 320 and a polarized component that does not pass through the polarizer 320. The value of $S_1$ described here is a value in a case where the polarizer 341 is a polarizer that passes only a polarized component the polarization direction of which is parallel to the polarization direction x. When the polarizer 341 is a polarizer that passes only a polarized component the polarization direction of which is inclined 90° with respect to the polarization direction x, the sign of the value of $S_1$ is reversed.

Figure 5:
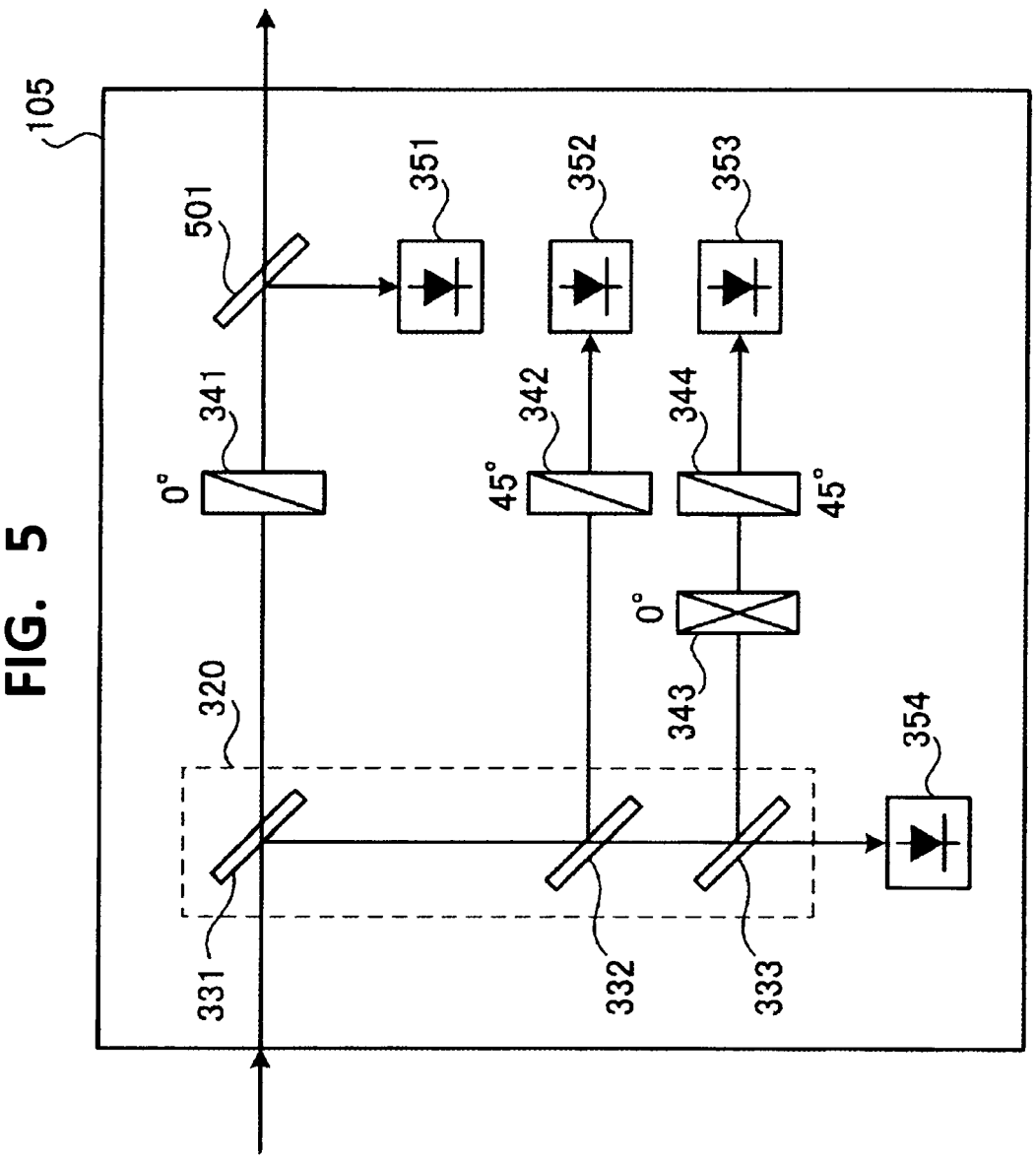
FIG. 5 is a second block diagram showing the structure of the monitoring-and-extracting unit of the optical switch according to the embodiment.

FIG. 5 is a second block diagram showing the structure of the monitoring-and-extracting unit of the optical switch according to the embodiment. In FIG. 5, the same reference numerals as in the monitoring-and-extracting unit 105 shown in FIG. 3 are assigned to corresponding components, and the description is omitted. The monitoring-and-extracting unit 105 of the optical switch 100 according to the embodiment may further include a dividing unit 501, as shown in FIG. 5.

The dividing unit 501 splits light output from the polarizer 341 to the PD 351 to output one split light component to the PD 351 and the other split light component to the signal light output unit 113. In this arrangement, the function of the aforementioned polarizer 320 (see FIG. 3) can be added to the polarizer 341. Thus, the polarizer 320 can be omitted.

Moreover, a function of monitoring the polarization states of signal light and control light having passed through the nonlinear medium 104 and a function of extracting a polarized component of signal light having passed through the nonlinear medium 104, the polarization direction of the polarized component being parallel to the polarization direction x, and outputting the polarized component to the signal light output unit 113 can be implemented via a single component. Thus, a situation in which, after the polarization states of signal light and control light are monitored, the polarization state of signal light changes before a polarized component of signal light is extracted, can be avoided.

Moreover, a situation in which, after a polarized component of signal light is extracted, the control state of signal light or control light changes before the polarization state of signal light or control light is monitored, can be avoided. Thus, the polarization state of signal light or control light can be accurately monitored to appropriately perform the switching operation.

In this case, the dividing unit 501 splits light output from the polarizer 341 to the PD 351. Alternatively, the dividing unit 501 may split light output from the polarizer 342 to the PD 352 or light output from the polarizer 344 to the PD 353 to output one split light component to the signal light output unit 113. In this case, the aforementioned polarization direction x is a polarization direction that is parallel to a pass axis of the polarizer 342 or the polarizer 344.

In this way, in the optical switch according to the embodiment, since the polarization states of signal light and control light having passed through the nonlinear medium 104 are monitored, and feedback control of the polarization controller 102a and the polarization controller 102b is performed on the basis of the monitored polarization states, polarization can be appropriately adjusted in response to the polarization states of signal light and control light. Thus, signal light can be stably and correctly switched regardless of the polarization states of signal light and control light.

Figure 6:
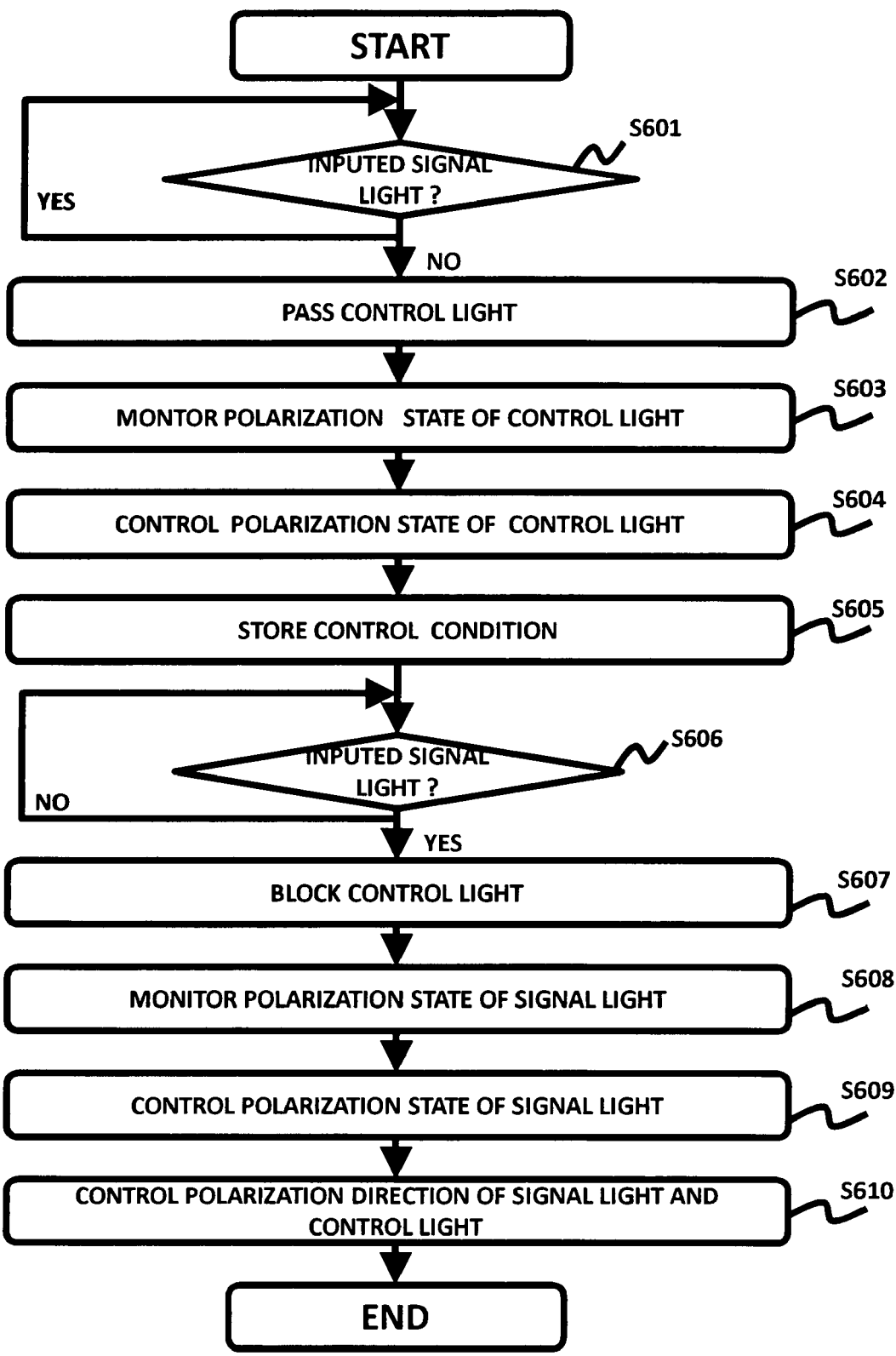
FIG. 6 is a flowchart showing the operation of the optical switch according to the embodiment.

FIG. 6 is a flowchart showing the operation of the optical switch according to the embodiment. It is first determined by the input detection unit 107 whether signal light is being input to the signal light input unit 101a (step S601), as shown in FIG. 6. When signal light is being input, a waiting operation is kept until signal light is not input (step S601: Loop for Yes).

When signal light is not being input in step S601 (step S601: No), the control unit 109 controls the blocking unit 108 via the drive unit 110 to pass control light to be output to the monitoring-and-extracting unit 105 (step S602). In this case, only control light is output to the monitoring-and-extracting unit 105. Then, the polarization state of control light is monitored by the monitoring-and-extracting unit 105 (step S603).

Then, the control unit 109 controls the polarization controller 102b on the basis of the polarization state monitored in step S603 to adjust the polarization direction of control light (step S604). In this case, the control unit 109 performs adjustment such that the polarization direction of control light is inclined 45° with respect to the polarization direction x. Specifically, the control unit 109 adjusts the polarization direction of control light so that calculated Stokes parameters ($S_0$, $S_1$, $S_2$, $S_3$)=(1, 0, 1, 0) or (1, 0, −1, 0).

Then, the control unit 109 stores, in the memory 112, control conditions at the time the polarization direction of control light is inclined 45° with respect to the polarization direction x (step S605). Then, it is again determined by the input detection unit 107 whether signal light is being input to the signal light input unit 101a (step S606). When signal light is not being input, a waiting operation is kept until signal light is input (step S606: Loop for No).

When signal light is being input in step S606 (step S606: Yes), the control unit 109 controls the blocking unit 108 to block control light to be output to the monitoring-and-extracting unit 105 (step S607). In this case, only signal light is output to the monitoring-and-extracting unit 105. Then, the polarization state of signal light is monitored by the monitoring-and-extracting unit 105 (step S608).

Then, the control unit 109 controls the polarization controller 102a on the basis of the polarization state monitored in step S608 to adjust the polarization direction of signal light (step S609). In this case, the control unit 109 performs adjustment such that the polarization direction of signal light is inclined 90° with respect to the polarization direction x. Specifically, the control unit 109 adjusts the polarization direction of signal light so that calculated Stokes parameters ($S_0$, $S_1$, $S_2$, $S_3$)=(1, −1, 0, 0).

When the aforementioned steps are performed, the polarization direction of signal light is adjusted to a polarization direction that is inclined 90° with respect to the polarization direction x, and the polarization direction of control light is adjusted to a polarization direction that is inclined 45° with respect to the polarization direction x. Thus, the polarization direction of signal light is rotated toward the polarization direction x by inputting signal light and control light to the nonlinear medium 104, thereby enabling switching by the optical switch 100.

Then, the control unit 109 controls the polarization controller 102a on the basis of control conditions adjusted in step S609 to adjust the polarization direction of signal light, and controls the polarization controller 102b on the basis of the control conditions saved in step S605 to adjust the polarization direction of control light (step S610). Switching of signal light by the optical switch 100 is started by this operation.

In this way, in a control method according to the embodiment, after only the polarization state of control light is first monitored to adjust the polarization direction of control light, only the polarization state of signal light is monitored to adjust the polarization direction of signal light. Then, switching can be started. Thus, the optical switch 100 can be stably operated regardless of the polarization states of signal light and control light.

In step S607, the control unit 109 may control the polarization controller 102b to block control light before control light and signal light are coupled in the coupling unit 103 so as not to output control light to the nonlinear medium 104. In this arrangement, a situation in which signal light to be output to the monitoring-and-extracting unit 105, together with control light, passes through the nonlinear medium 104, so that the polarization direction is rotated, can be avoided. In this case, in step S610, the polarization controller 102b needs to be controlled so as to again output control light to the nonlinear medium 104.

Figure 7:
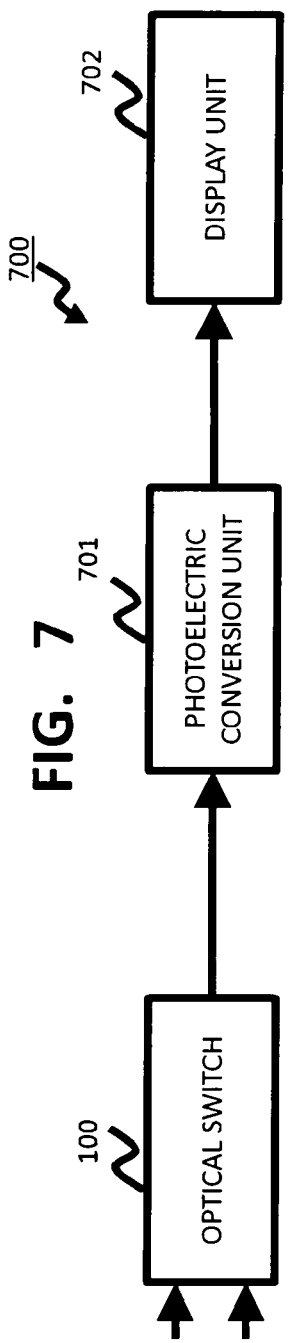
FIG. 7 is a block diagram showing the structure of an optical waveform measuring device according to the embodiment.
Figure 8:
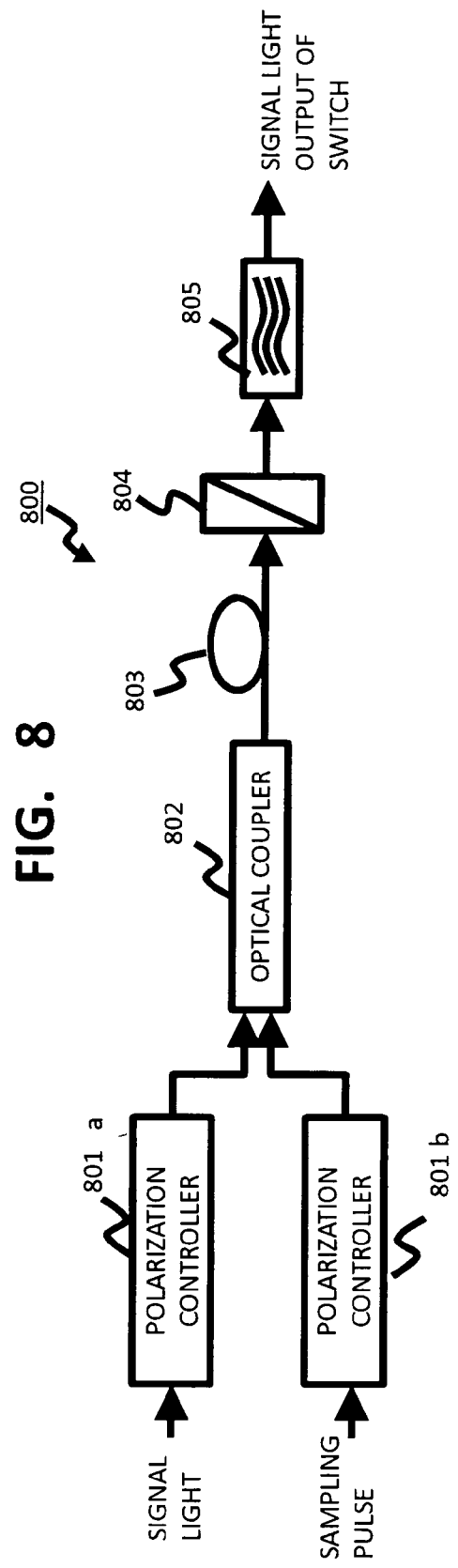
FIG. 8 is a block diagram showing the structure of a known optical switch.

FIG. 7 is a block diagram showing the structure of an optical waveform measuring device according to the embodiment. An optical waveform measuring device 700 according to the embodiment includes the aforementioned optical switch 100, a photoelectric conversion unit 701, and a display unit 702, as shown in FIG. 7. The optical waveform measuring device 700 inputs signal light subjected to measurement to the signal light input unit 101a of the optical switch 100, and inputs sampling pulses to the control light input unit 101b of the optical switch 100 as control light. The photoelectric conversion unit 701 converts signal light that is sampled and output from the signal light output unit 113 of the optical switch 100 to electrical signals. The display unit 702 displays the waveforms of electrical signals converted by the photoelectric conversion unit 701.

In this way, in the optical waveform measuring device 700 according to the embodiment, waveforms sampled by the optical switch 100, which can appropriately adjust polarization in response to the polarization states of signal light and control light, can be displayed. Thus, an accurate waveform of light can be stably measured regardless of the polarization states of signal light and control light.

As described above, in the optical switch according to the embodiment, signal light can be stably and correctly switched regardless of the polarization states of signal light and control light. Moreover, in the optical waveform measuring device according to the embodiment, the waveform of signal light can be stably and correctly measured regardless of the polarization states of signal light and control light. Moreover, in the control method according to the embodiment, the optical switch can be stably operated regardless of the polarization states of signal light and control light.

As described above, an optical switch, an optical waveform measuring device, and a control method according to the embodiments are useful as an optical switch in which a nonlinear optical effect produced in a nonlinear medium is used, an optical waveform measuring device, and a method for controlling an optical switch, especially when the polarization states of input signal light and control light are unstable.

As described above, in the present embodiment, an advantage in which signal light can be stably and correctly switched and the waveform of signal light can be stably and correctly measured regardless of the polarization states of input signal light and control light can be achieved.

What is claimed is:

1. An optical switch, comprising:
 a first polarization controller configured to control a polarization of a signal light;
 a second polarization controller configured to control a polarization of a control light;
 a coupler configured to multiplex the signal light outputted from the first polarization controller and the control light outputted from the second polarization controller;
 a nonlinear medium configured to generate an intensity correlation signal between the signal light and the control light, the nonlinear medium passing the signal light and the control light outputted from the coupler;
 a monitor configured to monitor polarization states of the signal light outputted from the nonlinear medium and the control light outputted from the nonlinear medium;
 a controller configured to control the first polarization controller and the second polarization controller on the basis of the polarization state monitored by the monitor so as to incline the polarization of the signal light and the polarization of the control light with respect to a predetermined polarization direction; and
 a blocking unit configured to block or pass, under control of the controller, the control light out of the signal light and the control light outputted from the nonlinear medium to the monitor so that polarization states of the signal light and the control light are adjusted, respectively.

2. An optical switch according to the claim 1, wherein the controller controls the first polarization controller for controlling the polarization of the signal light inclined 90 degree with respect to the predetermined polarization direction and the second polarization controller for controlling the polarization of the control light inclined 45 degree with respect to the predetermined polarization direction.

3. An optical switch according to the claim 1, further comprising a detector configured to detect light outputted from the signal light input unit.

4. An optical switch according to the claim 3, wherein the controller controls the second polarization controller for controlling the polarization of the control light inclined with respect to the predetermined polarization direction in the absence of the signal light.

5. An optical switch according to the claim 3, wherein the controller controls the second polarization controller for blocking the control light and the first polarization controller for controlling the polarization of the signal light so as to incline the polarization of the signal light with respect to the predetermined polarization direction in a case of detecting the signal light.

6. An optical switch according to the claim 1, wherein the blocking unit blocks the control light after being propagated in the nonlinear medium, wherein the controller controls the blocking unit so as to block the control light after being propagated in the nonlinear medium in a case of detecting the signal light.

7. An optical switch according to the claim 1 further comprising a memory for storing a control information for controlling the first polarization controller and the second polarization controller, wherein the controller stores the control information in the memory, the controller controlling the first polarization controller and the second polarization controller on the bases of the stored control information.

8. An optical switch according to the claim 1, wherein the monitor monitors polarization state information including an intensity of the signal light and the control light after propagated the nonlinear medium, an intensity of the predetermined polarization direction of the signal light and the control light after propagated the nonlinear medium, an intensity of 45 degree polarization direction component of the signal light and the control light after propagated the nonlinear medium with respect to the predetermined polarization direction and an intensity of circularly polarized component of the signal light and the control light after propagated the nonlinear medium;
 wherein the monitor sends the polarization state information to the controller; and wherein the controller calculates Stokes parameters on the basis of the polarization state information and controls the first polarization controller and the second polarization controller on the basis of the Stokes parameters.

9. An optical switch according to the claim 1, wherein the monitor comprises:
 a optical power splitter for splitting the signal light and the control light transmitted the nonlinear medium into four split light;

a first polarizer inputted the first split light and passing through a 90 degree inclined polarization component light with respect to the predetermined polarization direction or a parallel polarization component light with respect to the predetermined polarization direction;

a second polarizer inputted the second split light and passing through a 45 degree inclined polarization component light with respect to the predetermined polarization direction;

a quarter-wave plate inputted the third split light and passing through circularly polarized component light;

a third polarizer inputted an outputted light outputted form the quarter-wave plate and passing through a 45 degree inclined polarization component light with respect to the predetermined polarization direction; and a plurality of photo diodes receiving outputted light form the first polarizer, the second polarizer, the third polarizer and the optical power splitter, respectively;

wherein the controller calculates Stokes parameters on the basis of the output of the photo diodes and controls the first polarization controller and the second polarization controller on the basis of Stokes parameters.

10. A method for controlling an optical switch having a first polarization controller for controlling a polarization direction of a signal light, a second polarization controller for controlling a polarization direction of the control light and a nonlinear medium for transmitting the control light and the signal light, the method comprising:

passing the control light;

monitoring a polarization state of the control light outputted from the nonlinear medium;

controlling the second polarization controller for inclining a polarization direction of the control light with respect to a predetermined polarization direction on the basis of the polarization state of the control light;

blocking the control light;

monitoring a polarization state of the signal light outputted from the nonlinear medium; and controlling the first polarization controller for inclining a polarization direction of the control light with respect to the predetermined polarization direction on the basis of the polarization state of the signal light.

* * * * *